(12) United States Patent
Borean et al.

(10) Patent No.: US 10,848,279 B2
(45) Date of Patent: Nov. 24, 2020

(54) METHOD FOR SHARING NETWORK RESOURCES MADE ACCESSIBLE BY A SET OF ACCESS GATEWAYS

(71) Applicant: TELECOM ITALIA S.p.A., Milan (IT)

(72) Inventors: Claudio Borean, Turin (IT); Pino Castrogiovanni, Turin (IT); Ennio Grasso, Turin (IT); Dario Mana, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 160 days.

(21) Appl. No.: 16/065,949

(22) PCT Filed: Dec. 28, 2015

(86) PCT No.: PCT/EP2015/081278
§ 371 (c)(1),
(2) Date: Jun. 25, 2018

(87) PCT Pub. No.: WO2017/114547
PCT Pub. Date: Jul. 6, 2017

(65) Prior Publication Data
US 2019/0020449 A1 Jan. 17, 2019

(51) Int. Cl.
*H04L 5/00* (2006.01)
*H04L 12/24* (2006.01)
(Continued)

(52) U.S. Cl.
CPC ........ *H04L 5/0032* (2013.01); *H04L 41/0896* (2013.01); *H04L 47/39* (2013.01); *H04L 69/24* (2013.01); *H04W 88/16* (2013.01)

(58) Field of Classification Search
CPC ..... H04L 5/0032; H04L 4/0896; H04L 47/39; H04L 69/24; H04W 88/16
(Continued)

(56) References Cited

U.S. PATENT DOCUMENTS

2010/0202305 A1\* 8/2010 Wijting ................ H04W 16/14
370/252
2011/0022697 A1 1/2011 Huh
(Continued)

FOREIGN PATENT DOCUMENTS

EP 2 869 629 A1 5/2015

OTHER PUBLICATIONS

International Search Report dated Sep. 23, 2016 in PCT/EP2015/081278, 4 pages.
(Continued)

*Primary Examiner* — Christopher R Crompton
(74) *Attorney, Agent, or Firm* — Oblon, McClelland, Maier & Neustadt, L.L.P.

(57) ABSTRACT

A method for sharing network resources made accessible by plural access gateways (AG). An AG requester sends a resource request to neighbouring AGs as potential helpers. Each potential helper decides whether to cooperate with the requester based on a reputation score calculated by the potential helper for the requester. The reputation score calculated by each potential helper for the requester is indicative of the requester's behaviour in response to past resource requests received from that potential helper. If the potential helper decides to cooperate, it sends a resource offer to the requester. The requester then selects its helper as the potential helper which sent the best offer, and sets up a resource sharing session with the helper. The requester then
(Continued)

updates the reputations scores of a helper and potential helpers based on the disposition to cooperate and reliability they exhibited.

16 Claims, 4 Drawing Sheets

(51) Int. Cl.
  *H04L 29/06* (2006.01)
  *H04L 12/801* (2013.01)
  *H04W 88/16* (2009.01)
(58) Field of Classification Search
  USPC .......................................................... 370/329
  See application file for complete search history.

(56) References Cited

U.S. PATENT DOCUMENTS

| | | | | |
|---|---|---|---|---|
| 2011/0191342 | A1* | 8/2011 | Cohen | G06Q 30/02 707/737 |
| 2013/0316681 | A1 | 11/2013 | Huang et al. | |
| 2014/0313280 | A1* | 10/2014 | Takuno | H04M 1/663 348/14.08 |
| 2017/0169456 | A1* | 6/2017 | Mukherjee | G06Q 30/0206 |

OTHER PUBLICATIONS

Ballester Carlos et al., "A User-centric Approach to Trust Management in Wi-Fi Networks", Computer Communications Workshops (Infocom Wkshps), 2013 IEEE Conference on, IEEE, XP032700526, Apr. 14, 2013, pp. 9-10.

IEEE Std 802.11ac™-2013, "IEEE Standard for Information technology—Telecommunications and information exchange between systems; Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6 GHz", IEEE Computer Society, 2013, 424 pages.

IEEE Std 802.11n™-2009, "IEEE Standard for Information technology—Telecommunications and information exchange between systems; Local and metropolitan area networks—Specific requirements; Part 11: Wireless LAN Medium Access Control (MAC) and Physical Layer (PHY) Specifications; Amendment 5: Enhancements for Very High Throughput", IEEE Computer Society, 2009, 535 pages.

* cited by examiner

METHOD FOR SHARING NETWORK RESOURCES MADE ACCESSIBLE BY A SET OF ACCESS GATEWAYS

TECHNICAL FIELD

The present invention relates to the field of local area communication networks. In particular, the present invention relates to a method for sharing the network resources made accessible by a set of access gateways.

BACKGROUND ART

As known, an access gateway (or, briefly, AG) is a device which is connected to a WAN (Wide Area Network) via a broadband link (e.g. an ADSL or VDSL link or an optical fiber link) and which provides one or more user devices (PCs, smartphones, tablets, smart TVs, etc.) with connectivity to such broadband link to and from the WAN. The user devices then may access the WAN through the AG via the broadband link.

The connectivity offered by the AG may be wired, in which case the user devices are connected to the AG via cables (e.g. Ethernet cables). Alternatively, the connectivity offered by an AG may be wireless, in which case the AG and user devices located in its coverage area form a WLAN (Wireless Local Area Network) and communicate using a wireless technology (e.g. Wi-Fi).

Access gateways are typically used in HANs (Home Area Network). A HAN typically comprises a single AG and a number of user devices pertaining to a same user and located at his home.

The broadband link connecting an AG to a WAN provides a certain uplink throughput and downstream throughput, which in most cases is sufficient for the user's needs. In some cases, however, a user may suffer from the limits of his available throughput (especially its uplink throughput), which may be insufficient to provide her/him an adequate quality of experience. For instance, if the user wishes to upload a number of photos to the cloud, the uplink throughput of the broadband link made accessible by his AG may be insufficient to allow the user completing the upload in an acceptably short time.

EP 2 869 629 discloses a method for coordinating a cluster of access points (APs) of a WLAN, wherein each access point of the cluster monitors network data traffic information from user devices connected thereto and detects neighbour access points. Each access point of the cluster also provides a remote server with a status profile by using the network data traffic information and information relating the detected neighbour access points, and also reports its own identifier to a remote server. Each access point then obtains from the remote server identifier and status profile of the other access points, uses them for building a list of access points available for backhauling aggregation and establishes a connection with them, thereby forming a sub-cluster of access points. One of the access points of the sub-cluster acts as a cluster coordinator that coordinates the sub-cluster of access points for backhauling aggregation.

SUMMARY OF THE INVENTION

The Applicant has noticed that the method described by EP 2 869 629, which basically allows a user to connect simultaneously to multiple access points thereby temporarily increasing his upstream throughput, has some drawbacks.

The approach of EP 2 869 629 is indeed a centralized approach, wherein the access points exchange their status profiles via a centralized remote server in order to form the sub-clusters, and wherein cooperation between the access points of a sub-cluster for implementing backhauling aggregation is enforced by the access point coordinator of the sub-cluster.

On one hand, this centralized system is disadvantageously quite complex, because both the remote server and the cluster coordinator shall monitor the behaviour of the access points and gather information therefrom. Also the procedure for electing the cluster coordinator is quite complex.

On the other hand, this centralized system is disadvantageously vulnerable, because a malfunctioning or unavailability of the cluster coordinator unavoidably results in a collapse of the whole backhauling aggregation mechanism.

In view of the above, the Applicant has tackled the problem of providing a method for sharing the network resources made accessible by a set of access gateways (in particular, but not exclusively, the uplink and downlink throughputs offered by their respective broadband links to the WAN) which overcomes the aforesaid drawbacks.

In particular, the Applicant has tackled the problem of providing a method for sharing the network resources made accessible by a set of access gateways (in particular, but not exclusively, the uplink and downlink throughputs offered by their respective broadband links to the WAN) wherein cooperation between the access gateways is implemented in an autonomous and self-sustained way, namely without requiring any centralized entity which enforces the cooperation between the access gateways, so as to provide a simpler and more robust cooperation mechanism.

According to embodiments of the present invention, this problem is solved by configuring each AG to cooperate with the neighbouring AGs according to the game theory.

The inventors have indeed noticed that sharing the network resources amongst a set of neighbouring (namely, mutually visible) AGs may be seen as an iterated donation game. As known, in an iterated donation game, each time the game is repeated (namely, at each single resource sharing session) an AG acts as a requester that requests resources to the neighbouring AGs, which in turn act as potential helpers. The AGs as potential helpers are assumed to be rational players autonomously deciding whether to cooperate with the requester AG or to defect. In particular, each AG as a potential helper may decide either to cooperate by offering a benefit b (namely, by providing at least part of the requested resources) to the requester AG at a personal cost c, or to defect by offering nothing (namely, by denying the requested resources).

The game theory has proven that cooperation between players in the iterated donation game becomes the most rational choice if (i) the number of game iterations is unknown to players (a player who is sure to play only once with another player is more tempted to be selfish and defect) and (ii) incentives are provided in terms of rewards for cooperation and/or punishments for defection.

Condition (i) is met in the context of neighbouring AGs, since each AG does not know a priori how many times it will need to request resources to its neighbouring AGs or it will be asked for resources by its neighbouring AGs in the future.

As to condition (ii), according to embodiments of the present invention an incentive to cooperation is provided to the AGs in the form of a reputation score. In particular, each AG preferably computes a reputation score for anyone of the neighbouring AGs, which is indicative of the behaviour of that particular neighbouring AG in response to its past resource requests. The reputation score in particular takes into account (a) the resource credit accumulated relative to that neighbouring AG (namely, the algebraic summation of resources provided to and received from that neighbouring AG in the past), (b) the disposition shown by that neighbouring AG to cooperate (namely, the ratio between resources offered by that neighbouring AG and resources requested to that neighbouring AG in the past) and (c) its reliability (namely, the ratio between resources actually provided and resource offered by that neighbouring AG in the past).

According to embodiments of the present invention, as an AG receives a resource request from a neighbouring AG, it decides whether to cooperate by offering at least part of the requested resources or to defect by offering no resources at all based on the reputation score it calculated for the requester AG. At the end of the sharing session, the requester AG updates the reputation score for every neighbouring AG that received its request, based on the resources that it offered and actually provided during the sharing session.

An AG is therefore advantageously stimulated to cooperate with its neighbouring AGs. An AG which normally cooperates by offering at least part of the requested resources and by actually providing them will have indeed a high reputation score at the other AGs which requested its cooperation. If, in the future, it will be in the need of requesting resources to the neighbouring AG, the neighbouring AGs—which decide whether to cooperate based on the reputation score they calculated for it—will be willing to cooperate with it and will more likely offer their resources. On the contrary, an AG which normally defects and offers no resources (or offers resources but actually does not provide them) will instead have a low reputation score at the other AGs which requested its cooperation. If, in the future, it will be in the need of requesting resources to the neighbouring AGs, the neighbouring AGs—which decide whether to cooperate based on the reputation score they calculated for it—will be not willing to cooperate with it and will likely defect.

Hence, the reputation score as described above is an incentive to cooperation for the AGs. Such cooperation is advantageously self-sustained, in that it is implemented by the AGs themselves, without the need of any central entity enforcing cooperation.

Hence, the method of the invention advantageously requires the exchange of a few messages between the AGs for setting up a resource sharing session. Further, advantageously, the method of the invention is robust, since it is capable of automatically adapting to the temporarily or permanent unavailability of any one of the AGs. The subject method is also advantageously capable of automatically scaling, namely automatically adapting to the arrival of new AGs (a new AG will soon start cooperating with the pre-existing AGs, provided it is also configured to implement the reputation score mechanism as described above). The subject method is also robust against fraudulent attempts to "steal" resources to the AGs, since an AG trying to fraudulently obtain resources from the other AGs without reciprocating will soon be excluded from the sharing mechanism (its reputation score at the other AGs will be soon low enough to induce the other AGs to permanently defect its requests).

According to a first aspect, the present invention provides for a method for sharing network resources made accessible by a set of access gateways, the method comprising:

a) at a first access gateway of the set of access gateways, sending a resource request to a second access gateway of the set of access gateways;

b) at the second access gateway, deciding whether to cooperate with the first access gateway by offering at least part of the requested resources based on a reputation score calculated by the second access gateway for the first access gateway, the reputation score being indicative of a behavior of the first access gateway in response to at least one past resource request sent by the second access gateway to the first access gateway and, in the affirmative, sending a resource offer to the first access gateway; and c) at the first access gateway, deciding whether to accept the resource offer sent by the second access gateway to the first access gateway and, in the affirmative, setting up a resource sharing session with the second access gateway.

Preferably, at step b) the reputation score of the first access gateway is calculated by the second access gateway taking into account a resource credit of the second access gateway towards the first access gateway, the credit being calculated by the second access gateway as an algebraic sum of amounts of resources provided by the second access gateway to the first access gateway and amounts of resources received by the second access gateway from the first access gateway in at least one past resource sharing session.

Preferably, at step b) the reputation score of the first access gateway is calculated by the second access gateway taking into account a disposition shown by the first access gateway to cooperate with the second access gateway, the disposition being calculated as a ratio between an amount of resources offered by the first access gateway to the second access gateway in response to at least one past resource request sent by the second access gateway to the first access gateway and an amount of resources requested by the second access gateway in the at least one past resource request.

Preferably, at step b) the reputation score of the first access gateway is calculated by the second access gateway taking into account a reliability shown by the first access gateway toward the second access gateway, the reliability being calculated as a ratio between an amount of resources actually provided by the first access gateway to the second access gateway in response to at least one past resource request sent by the second access gateway to the first access gateway and an amount of resources offered by the first access gateway to the second access gateway in response to the at least one past resource request.

According to advantageous embodiments, at step b) the second access gateway decides to cooperate with the first access gateway if the reputation score is higher than a threshold value.

Preferably:
step a) comprises sending the resource request by the first access gateway to a plurality of identified potential helpers including the second access gateway, each potential helper being identified by the first access gateway as an access gateway of the set of access gateways whose signal strength received at the first access gateway is above a minimum threshold capable of guaranteeing a minimum throughput between the first access gateway and the potential helper;
at step b) each potential helper decides whether to cooperate with the first access gateway based on a reputation score calculated by the potential helper for the first access gateway, the reputation score being indicative of a behavior of the first access gateway in response to at least one past resource request sent by the potential helper to the first access gateway and, in the affirmative, sends a respective resource offer to the first access gateway; and step c) comprises receiving resource offers from potential helpers which at step b) decided to cooperate and deciding whether the resource offer received from the second access gateway is the best offer amongst the received resource offers.

Preferably:

at step a) the resource request comprises at least an amount of resources requested by the first access gateway and a time interval T for which the amount of resources is requested by the first access gateway; and at step b) the resource offer sent by each one of the potential helpers comprises at least an amount of resources offered by the potential helper and a time interval Tj for which the amount of resources is offered by the potential helper.

Preferably, step c) comprises:

calculating a value of an offered quality of experience parameter for the resource offer received from each potential helper, the offered quality of experience parameter being calculated based on the amount of resources offered by the potential helper and the time interval Tj for which the amount of resources is offered by the potential helper; and deciding whether the resource offer received from the second access gateway is the best offer amongst the received resource offers by deciding whether the resource offer received from the second access gateway has the highest value of offered quality of experience.

Preferably, after the resource sharing session is closed, the first access gateway updates a further reputation score of each one of the potential helpers, the further reputation score being indicative of a behavior of the potential helper in response to at least one past resource request sent by the first access gateway to the potential helper.

Preferably:

for the second access gateway, the updating comprises adding to a current value of the further reputation score a value which depends on a ratio between an amount of resources provided by the second access gateway to the first access gateway during the resource sharing session and an amount of resources offered in the resource offer sent by the second access gateway to the first access gateway at step b); and for each potential helper other than the second access gateway, the updating comprises adding to a current value of the further reputation score a value which depends on a ratio between an amount of resources offered by the potential helper to the first access gateway and an amount of resources requested by the first access gateway in the resource request.

Preferably, after the resource sharing session is closed:

the first access gateway updates a credit value towards the second access gateway by subtracting therefrom an amount of resources provided by the second access gateway to the first access gateway during the resource sharing session; and the second access gateway updates a credit value towards the first access gateway by adding thereto the amount of resources provided by the second access gateway to the first access gateway during the resource sharing session.

Preferably, step c) comprises building an overlay network comprising at least one connection between the first access gateway and the second access gateway, which allows an end user connected to the first access gateway accessing the resources offered by the second access gateway.

According to a variant, the first access gateway comprises an access point and the second access gateway comprises at least one station device, the overlay network comprising a connection between the access point and the at least one station device.

According to a second variant, the first access comprises at least one station device and the second access gateway comprises an access point, the overlay network comprising a connection between the at least one station device and the access point.

According to a second aspect, the present invention provides for an access gateway configured to:

a) receive a resource request from a further access gateway;

b) decide whether to cooperate with the further access gateway by offering at least part of the requested resources based on a reputation score calculated by the access gateway for the further access gateway, the reputation score being indicative of a behavior of the further access gateway in response to at least one past resource request sent by the access gateway to the further access gateway and, in the affirmative, send a resource offer to the further access gateway; and c) if the further access gateway decides to accept the resource offer sent by the access gateway, set up a resource sharing session with the further access gateway.

According to a third aspect, the present invention provides a computer program product loadable in the memory of at least one computer and including software code portions for performing the steps of the method as set forth above, when the product is run on at least one computer.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
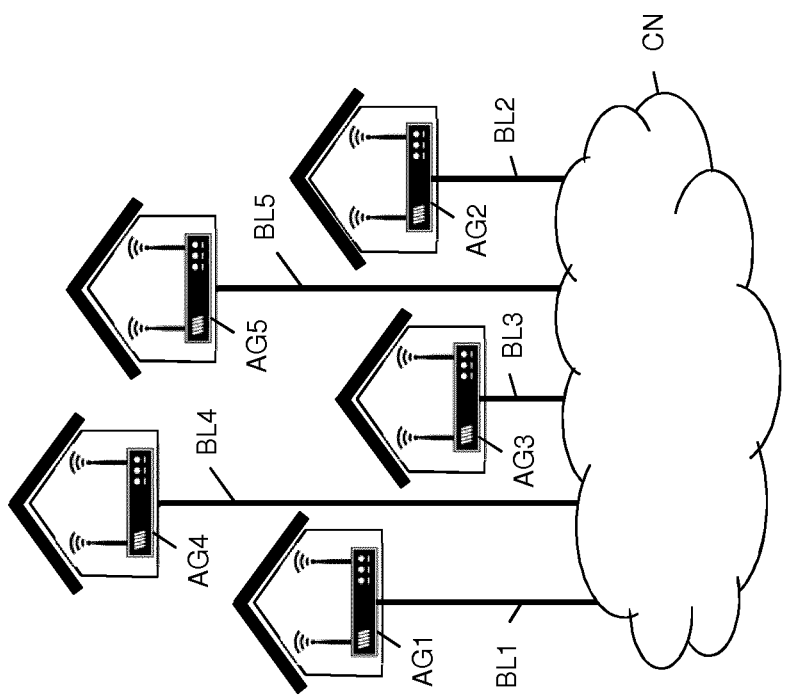
FIG. 1 schematically shows a set of access gateways suitable for implementing the method according to embodiments of the present invention.

FIG. 1 schematically shows a set of access gateways configured to implement the method for sharing the network resources they make accessible according to embodiments of the present invention. By way of non limiting example, in FIG. 1 five access gateways AG1, AG2, AG3, AG4, AG5 are shown. The access gateways AG1, AG2, AG3, AG4, AG5 are preferably located at the premises of five different users, who are neighbours. Each access gateway AG1, AG2, AG3, AG4, AG5 is preferably connected to a wired communication network CN (which includes an access network and a core network, such as a MAN or WAN) by means of a respective broadband link BL1, BL2, BL3, BL4, BL5. The broadband links may be e.g. ADSL or VDSL links, or fiber optics links. Each access gateway AG1, AG2, AG3, AG4, AG5 preferably provides wireless connectivity to user devices (not shown in FIG. 1 for simplicity) located in its coverage area by using a known short range wireless technology (e.g. Wi-Fi, Bluetooth, ZigBee, etc.).

For instance, the access gateways AG1, AG2, AG3, AG4, AG5 may be Wi-Fi gateways compliant to IEEE 802.11. Besides, each access gateway AG1, AG2, AG3, AG4, AG5 is preferably provided with multiple access points (AP) and multiple station devices on the same physical wireless interface.

As known, each AP basically provides a separate wireless access to the broadband link towards the communication network CN and is provided with a respective wireless identifier (or SSID). On the other hand, a station device of an access gateway is suitable for behaving as a client for another access gateway (in particular, for one of its APs).

According to embodiments of the present invention, each access gateway AG1, AG2, AG3, AG4, AG5 is preferably provided with at least:

a home network AP identified by a home network SSID (HN-SSID), which the access gateway uses for exchanging traffic with user devices pertaining to its owner and located at his home;

an overlay network AP identified by an overlay network SSID (ON-SSID), which the access gateway uses for establishing wireless connections with other access gateways for resources sharing purposes; and a station device, which the access gateway uses for establishing wireless connections with other access gateways for resources sharing purposes.

Besides, each access gateway AG1, AG2, AG3, AG4, AG5 is preferably provided with a software component (not shown in FIG. 1 for simplicity) configured to implement a sharing mechanism allowing any one of the users to temporarily use not only the resources accessible via his own access gateway, but also at least part of the resources accessible via the neighbouring access gateways. Herein after, by way of non limiting example, it is assumed that the shared resources are the downlink throughput and uplink throughput offered by the broadband links BL1, BL2, BL3, BL4, BL5.

The operation of each access gateway AG1, AG2, AG3, AG4, AG5 (and in particular of their software component configured to implement this sharing mechanism) according to embodiments of the present invention will be now described in detail.

Figure 2:
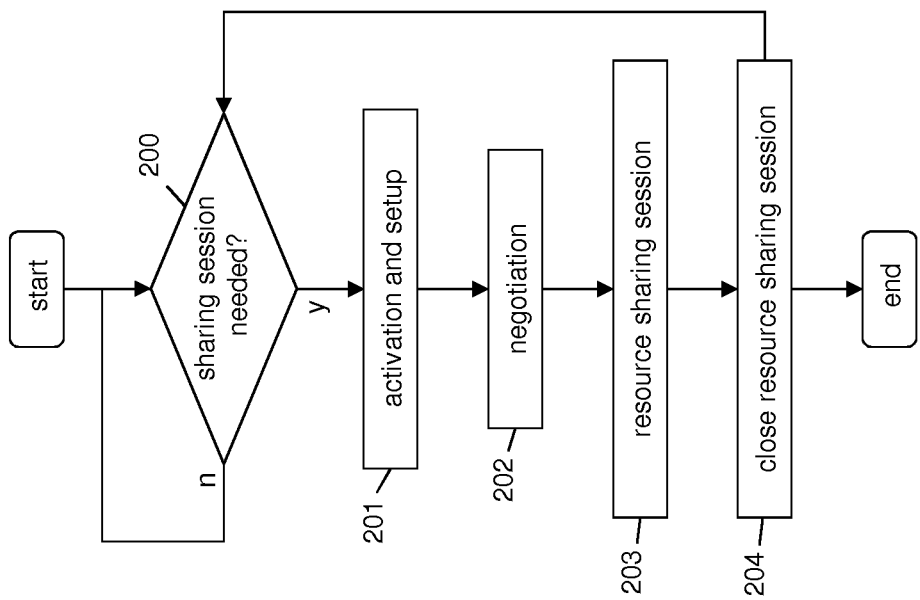
FIG. 2 is a flow chart of the method according to embodiments of the present invention.

As shown in FIG. 2, as an access gateway AGi (i=1, 2, 3, 4 or 5) detects that it needs activating a resource sharing session (step 200), it preferably performs an activation and setup step 201.

At step 200, the access gateway AGi (also termed herein after "requester") may automatically determine that a resource sharing session shall be opened. For instance, the requester AGi may automatically determine that a resource sharing session is needed if it detects that the bandwidth usage of its own broadband link BLi (i=1, 2, 3, 4 or 5) is close to a bandwidth threshold. Alternatively, the requester AGi may automatically determine that a resource sharing session is needed using an automated learning capability allowing the requester AGi learning the bandwidth usage habits of the user and then autonomously foreseeing the high bandwidth usage periods. Alternatively, the requester AGi may be manually instructed by its own user to activate a resource sharing session, for instance when the user is performing a download or upload operation which requires a particularly high throughput (e.g. the above cited example of the upload of photos to the cloud).

Figure 3:
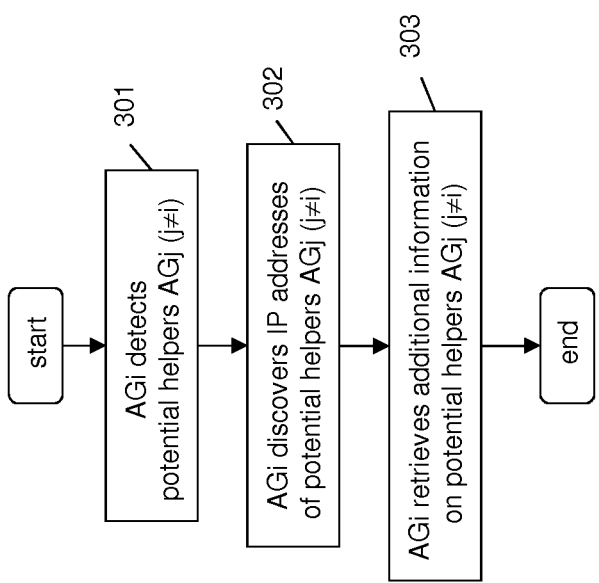
FIG. 3 is a more detailed flow chart of the activation and setup step of FIG. 2.

The activation and setup step 201 is shown in further detail in the flow chart of FIG. 3.

At step 201, the requester AGi preferably first of all detects potential helpers AGj (j≠i), namely access gateways which are configured to implement the resource sharing method of the invention and which are located substantially within its own coverage area (step 301).

Preferably, at step 301 the requester AGi identifies the potential helpers AGj by firstly performing a scanning procedure allowing the requester AGi to retrieve the wireless identifiers of all neighbouring access gateways. In particular, the requester AGi preferably performs a Wi-Fi scanning procedure allowing it to retrieve the SSIDs and associated MAC addresses of the neighbouring access gateways, and then identifies the potential helpers as those access gateways whose:

ON-SSIDs have a particular value, for instance a value starting with a common prefix and ending with a unique identifier; and RSSI (Received Signal Strength Indication) is above a certain threshold, e.g. −90 dB. Access gateways with RSSI below this threshold are preferably not considered as potential helpers, since their wireless signal is not strong enough to support a minimum throughput.

Then, the requester AGi preferably determines the IP address of each detected potential helper AGj (step 302). According to a variant, the requester AGi preferably retrieves the IP addresses of the potential helpers AGj from a remote repository (not shown in FIG. 1), where e.g. all the access gateways have previously registered their wireless identifiers (ON-SSID and optionally also HN-SSID) with associated MAC addresses. The IP address may be either a public IP address or a private IP address (e.g. a VPN or private subnetwork used to manage all the access gateways). In the latter case, according to a variant a unique private IP address is preferably statically associated to each access gateway and encoded in a unique ON-SSID, thus enabling the requester AGi to associate a discovered ON-SSID to the private IP address without the need to communicate with a remote repository.

Then, the requester AGi also preferably retrieves additional information relating to each detected potential helper AGj (step 303). This additional information may be either retrieved from the remote repository, or by sending specific requests to the IP addresses of the potential helpers AGj. Such additional information preferably comprises:

maximum uplink throughput and maximum downlink throughput of the broadband link BLj connecting the potential helper AGj to the network CN (e.g. 1 and 10 Mbps); and MAC address(es) associated to station device(s) of the potential helpers and, optionally, also its home network SSID and MAC address.

Instead of being carried out following to step 200, according to advantageous variants activation and setup 201 is periodically performed by the requester AGi (and by the other access gateways as well) during low traffic hours (e.g. at night or when the access gateway realizes that no relevant traffic is being exchanged with its own user devices). The access gateway then preferably stores the above information about the potential helpers (wireless identifiers, IP address and additional information) for later use. This advantageously prevents execution of step 201 (and in particular the SSID scanning) from causing an undesired temporary disconnection of the user devices from the access gateway.

By referring again to the flow chart of FIG. 2, the requester AGi and potential helpers AGj (j≠i) then preferably perform a negotiation step 202, during which the requester AGi requests cooperation to the potential helpers AGj (j≠i) determined at step 201. The negotiation step 202 is described in detail herein after, with reference to the flow chart of FIG. 4.

During the negotiation step 202, the requester AGi preferably sends a resource request to each one of the potential helpers AGj determined at step 201 (step 401). To this purpose, the requester AGi preferably uses a well known port and application protocol (e.g. HTTP/TCP or UDP). The resource request preferably specifies one or more parameters relating to the requested resources. For instance, the resource request to a potential helper AGj may specify:

- requested uplink throughput B, and requested downlink throughput $B_d$ (e.g. 1 Mbps and 100 Kbps respectively);
- time interval T for the requested throughput (e.g. next 10 minutes);
- role (AP or station device) that the potential helper AGj shall play in the overlay network;
- frequency band and wireless channel on which the overlay network shall be built (e.g. 2.4 GHz, channel 1);
- the last RSSI value measured for the potential helper AGj on its current frequency band and wireless channel, possibly with a timestamp associated with the measurement.

The values of B (namely, of $B_u$ and $B_d$) and T may be determined by the requester AGi in different ways. For instance, the requester AGi may determine the values of B (namely, of $B_u$ and $B_d$) and T automatically as a forecast based on past behaviours of the user's service demands, or using the first derivative of the growth in the user's throughput needs. Alternatively, the requester AGi may ask the user to specify which activity she/he is going to perform (e.g. downloading a file, watching a video in real time or so) and then determine the values of B and T based on the user's answer.

At step 401, the requester AGi also preferably calculates a value of a quality of experience parameter $v_i$, based on one or more of the above parameters relating to the requested resources ($B_u$, $B_d$, T, etc.). By way of non limiting example, the quality of experience parameter $v_i$ may be calculated according to the following equation:

$$v_i = \omega \cdot s + \int_0^T B^2 dt \qquad [1]$$

where B is the sum $B_u + B_d$ and s is a binary variable that equals 1 if the requester AGi is not willing to change frequency band and/or wireless channel at the request of the helper AGj, and 0 if the requester AGi is instead available to change frequency band and/or wireless channel at the request of the helper AGj. Finally, ω is a normalizing weight that weights the importance of not changing frequency band and/or channel relative to the throughput request. It shall be noticed that in equation [1] the value of the quality of experience parameter $v_i$ increases as T increases, but is geometrically higher if the total bytes are transferred in a shorter time.

Then, each potential helper AGj receiving the resource request from the requester AGi preferably determines whether to cooperate by offering at least part of the requested resources, or to defect by ignoring the resource request (step 402).

In order to decide whether to cooperate or defect upon reception of a resource request, each one of the access gateways preferably keeps track of its credit towards the access gateways with which it interacted in the past (namely those from which it received at least one resource request and/or to which it sent at least one resource request in the past). In particular, the access gateway AGi (i=1, 2 or 3) preferably calculates its credit towards the access gateway AGj (j≠i) according to the following equation:

$$c_{ij} = \sum_k \alpha^k \cdot v_{ij}^{(k)} \qquad [2]$$

where k is an index counting the past resource sharing sessions wherein AGi and AGj interacted, $v_{ji}^{(k)}$ is the quality of experience value quantifying the amount of resources provided by AGi to AGj at the $k^{th}$ session (positive if AGi provided resources to AGj and negative if AGi received resources from AGj) and α is an inflation factor comprised between 0 and 1 (more preferably between 0.9 and 0.99), which provides a smoothed exponential inflation to the credit over time (recent exchanges of resources are considered more relevant than past exchanges of resources). It may be appreciated that the credit is symmetric, namely $c_{ij} = -c_{ji}$.

Besides the credit $c_{ij}$, each access gateway also preferably keeps track of a reputation score $R_{ij}$ for each one of the access gateways to which it sent at least one resource request in the past. In particular, the access gateway AGi (i=1, 2 or 3) preferably calculates the reputation score of the access gateway AGj (j≠i) taking into account:

(a) its own credit $c_{ij}$ towards AGj calculated according to equation [2];
(b) the disposition shown by the access gateway AGj to cooperate with the access gateway AGi, which is preferably measured as the ratio between resources offered by AGj to AGi and resources requested by AGi to AGj in past negotiation sessions; and
(c) the reliability of AGj towards AGi, which is preferably measured as the ratio between resources actually provided by AGj to AGi in past resources sharing sessions and resources offered by AGj to AGi in past negotiation sessions.

While the credit $c_{ij}$ is an objective representation of the whole history of interactions between AGi and AGj (and is therefore symmetric, as described above), the reputation score $R_{ij}$ is asymmetric because it is a subjective assessment which each access gateway makes of the past behaviour of its neighbouring access gateways in response to its resources requests.

Preferably, all the access gateways assign a default initial reputation score $R_0$ to any new access gateway which takes part in a negotiation session as either a requester or a potential helper for the first time. Then, at each negotiation session involving the access gateway AGi and the access gateway AGj, the access gateway AGi preferably updates the value of the reputation score $R_{ij}$ of the access gateway AGj using a recursive formula, which will be described in detail herein after. Preferably, the value of the reputation score $R_{ij}$ is comprised between 0 and 1, so as to treat it as the probability by which AGi will cooperate with AGj. The initial reputation score $R_0$ may be set to an intermediate value (e.g. 0.5), meaning that the access gateways assume that the new access gateway is "neutral" from the disposition to cooperation and reliability point of view. Alternatively, the initial reputation score $R_0$ may be set to a higher value (e.g. 0.8), meaning that the access gateways initially assume that the new access gateway is quite willing to cooperate and reliable.

At step 402, each potential helper AGj (j≠i) receiving the resource request from the requester AGi preferably decides whether to cooperate or defect based on the reputation score $R_{ji}$, calculated by the potential helper AGj for the requester AGi and on the resources available currently and in the next future at the potential helper AGj itself. Hence, the reputation score $R_{ji}$, calculated by AGj for the requester AGi is indicative of a probability that AGj cooperates with AGi. A higher reputation score $R_{ji}$, (namely, closer to 1) results in a higher chance that the potential helper AGj affirmatively replies to the resource request of AGi, whereas a lower reputation score $R_{ji}$ (namely, closer to 0) results in a lower chance that the potential helper AGj affirmatively replies to the resource request of AGi.

In particular, according to a preferred embodiment, if the reputation score $R_{ji}$ is lower than a certain minimum threshold, the potential helper AGj decides to defect. Otherwise, if the reputation score $R_{ji}$ is equal to or higher than the threshold, the potential helper AGj decides to cooperate thus becoming an offeror. The minimum threshold may be for instance 0.5 ("tit-for-tat") or 0.2 ("generous tit-for-tat").

According to some variants, the potential helper AGj might request to its own user whether he wishes to cooperate with AGi, independently of the reputation score, e.g. via a pop-up window displayed on its user device.

Then, each offeror AGj preferably sends a respective resource offer to the requester AGi (step 403). In order to make a resource offer, according to an embodiment, each offeror AGj preferably assesses one or more of the following parameters:
- uplink throughput and downlink throughput unused on the broadband link BLj connecting the offeror AGj to the communication network CN, at present and possibly in the next future;
- wireless channel currently used by the offeror AGj on the requested frequency band (2.4 GHz and/or 5 GHz);
- throughput of traffic between the home network AP of the offeror AGj and the user devices of its owner wirelessly connected thereto on the requested frequency band, at present and possibly in the next future;
- throughput of traffic between the overlay network AP and/or station device(s) of the offeror AGj and other access gateways (if any) wirelessly connected thereto on the requested frequency band; and
- the last RSSI measured for the requester AGi on its current frequency band and wireless channel.

If the resource request does not specify any specific wireless channel to build the overlay network or if requester AGi and offeror AGj already use a same wireless channel, the offeror AGj preferably estimates a maximum throughput that may be provided by a wireless connection between requester AGi and offeror AGj on the wireless channel currently used by the offeror AGj. In order to make such estimation, each offeror AGj preferably uses the last RSSI measured for the requester AGi on its current frequency band and wireless channel. The maximum throughput depends inter alia on the interferences on that wireless channel.

TABLE I

| RSSI (dBm) | maximum throughput (Mbps) |
|---|---|
| −82 | 1.5 |
| −79 | 3 |
| −77 | 5 |
| −74 | 6.5 |
| −70 | 10 |
| −66 | 13 |
| −65 | 14.5 |
| −64 | 16 |

Table I set forth above shows exemplary values of the maximum throughput of a wireless connection between requester AGi and offeror AGj for different values of the RSSI of the requester AGi at the offeror AGj, in a worst case wherein the maximum throughput is assumed as 25% of the throughput values defined by IEEE 802.11 n standard for 20 MHz channels.

According to embodiments of the present invention, a table similar to Table I is stored at each access gateway, including the offeror AGj. The offeror AGj then preferably uses the last measured RSSI for retrieving the maximum throughput value therefrom.

If, otherwise, the wireless channel specified in the resource request from the requester AGi is not the one currently used by the offeror AGj, the offeror AGj shall also determine whether it may accept a wireless channel switch or not. In order to determine whether it may accept a wireless channel switch or not, the offeror AGj preferably determines whether its home traffic (namely traffic exchanged by user devices and its home network AP) is below a predefined threshold, and in the affirmative it accepts the channel switch. If the offeror AGj agrees to switch wireless channel and to use the one currently used by the requester AGi, the offeror AGj preferably determines the maximum throughput based on the last RSSI measured by the offeror AGj during the last Wi-Fi scan performed. Otherwise, if the requester AGi shall switch wireless channel and use the one currently used by the offeror AGj, the offeror AGj preferably determines the maximum throughput using the RSSI value contained in the resource request received from the requester AGi.

It shall be noticed that the offeror AGj may fully satisfy the resource request of the requester AGi only if both the throughput unused on the broadband link BLj and the estimated maximum throughput on the wireless connection between requester AGi and offeror AGj are higher than the requested throughput. Otherwise, the resource request of AGi may be only partially satisfied.

In any case, each offeror AGj sends its resource offer to the requester AGi. According to an embodiment of the present invention, the resource offer from an offeror AGj preferably comprises one or more parameters relating to the offered resources, including:
- offered uplink throughput $B_{uj}$ and offered downlink throughput $B_{dj}$ (e.g. 1 Mbps and 100 Kbps respectively);
- time interval $T_j$ for the offered throughput (e.g. next 10 minutes);
- role (AP or station device) that the offeror AGj will play in the overlay network;
- frequency band and wireless channel on which the overlay network will be built (e.g. 2.4 GHz, channel 1) which, as mentioned above, may be either the one requested by the requester AGi or the one already used by the offeror, if the offeror can not accept a channel switch;

the last RSSI value measured for the requester AGi on its current frequency band and wireless channel, possibly with a timestamp associated with the measurement.

The requester AGi therefore receives a resource offer from each one of the offerors AGj (j≠i).

Upon reception of the resource offers from the offerors AGj, the requester AGi preferably selects amongst them a best offer (step 404).

In order to select the best offer, the requester AGi preferably calculates a value of a quality of experience parameter $v_{ji}$ offered by the offeror AGj based on the parameters relating to the offered resources ($B_{uj}$, $B_{dj}$, $T_j$, etc.) comprised in the resource offer. By way of non limiting example, the quality of experience parameter $v_{ji}$ offered by the offeror AGj may be calculated according to the above equation [1], where $B_{uj}$, $B_{dj}$, $T_j$ are used instead of $B_u$, $B_d$, T. It shall be noticed that the offered quality of experience $v_{ji}$ is preferably comprised in a continuous range from 0 (no cooperation) to $v_i$ (complete cooperation, namely the offeror AGj offers to the requester AGi all the requested quality of experience).

Then, the requester AGi preferably calculates a partial reputation score $r_{ij}$ for each one of the received resource offers. The partial reputation score $r_{ij}$ calculated for the resource offer received from the offeror AGj preferably takes into account both the credit towards the offeror AGj and a level of satisfaction of the resource request, which basically is a ratio between offered resources and requested resources. According to a particularly preferred variant, the partial reputation score $r_{ij}$ calculated by the requester AGi for the resource offer received from the offeror AGj is provided by the following equation:

$$r_{ij} = R(v_i, v_{ji}, c_{ij}) = \min\left[1, \frac{v_{ji}}{v_i} + \sigma(-c_{ij})\right] \quad [4]$$

where $\sigma(-c_{ij})$ is a sigmoid mapping of the credit $c_{ij}$. Hence, a resource offer offering a higher quality of experience and coming from an offeror AGj towards which the resource debt is higher has a higher partial reputation score $r_{ij}$.

At step 404, the requester AGi preferably selects the best offer as the resource offer having the offered quality of experience parameter $v_{ji}$ with the highest value. Therefore, at step 404 the requester AGi will select the resource offer made by the offerer AGj* which offered most in response to the present resource request.

At step 404, the requester AGi also preferably sends a final acknowledge to the offeror AGj* which sent the best offer, and which will be termed herein after "helper". If the helper AGj* has accepted to switch wireless channel, reception of the final acknowledge from the requester AGi preferably triggers the channel switch at the helper AGj*.

The negotiation 202 is thus completed.

By referring again to the flow chart of FIG. 2, after negotiation 202 is completed, the resource sharing session between requester AGi and selected helper AGj* is started (step 203). Step 203 basically comprises building an overlay network between requester AGi and helper AGj* as a wireless connection between them, which allows the user devices of the owner of the requester AGi accessing the resources (namely, the throughput of the broadband link) offered by the helper AGj* for a time Tj*.

The setup of the overlay network between requester AGi and helper AGj* according to embodiments of the present invention will be now described in further detail, under the assumption that, amongst the gateways AG1, AG2, AG3, AG4, AG5 shown in FIG. 1, AG1 is the requester and AG2 and AG3 are the only offerors (AG4 and AG5 instead defected).

Figure 5:
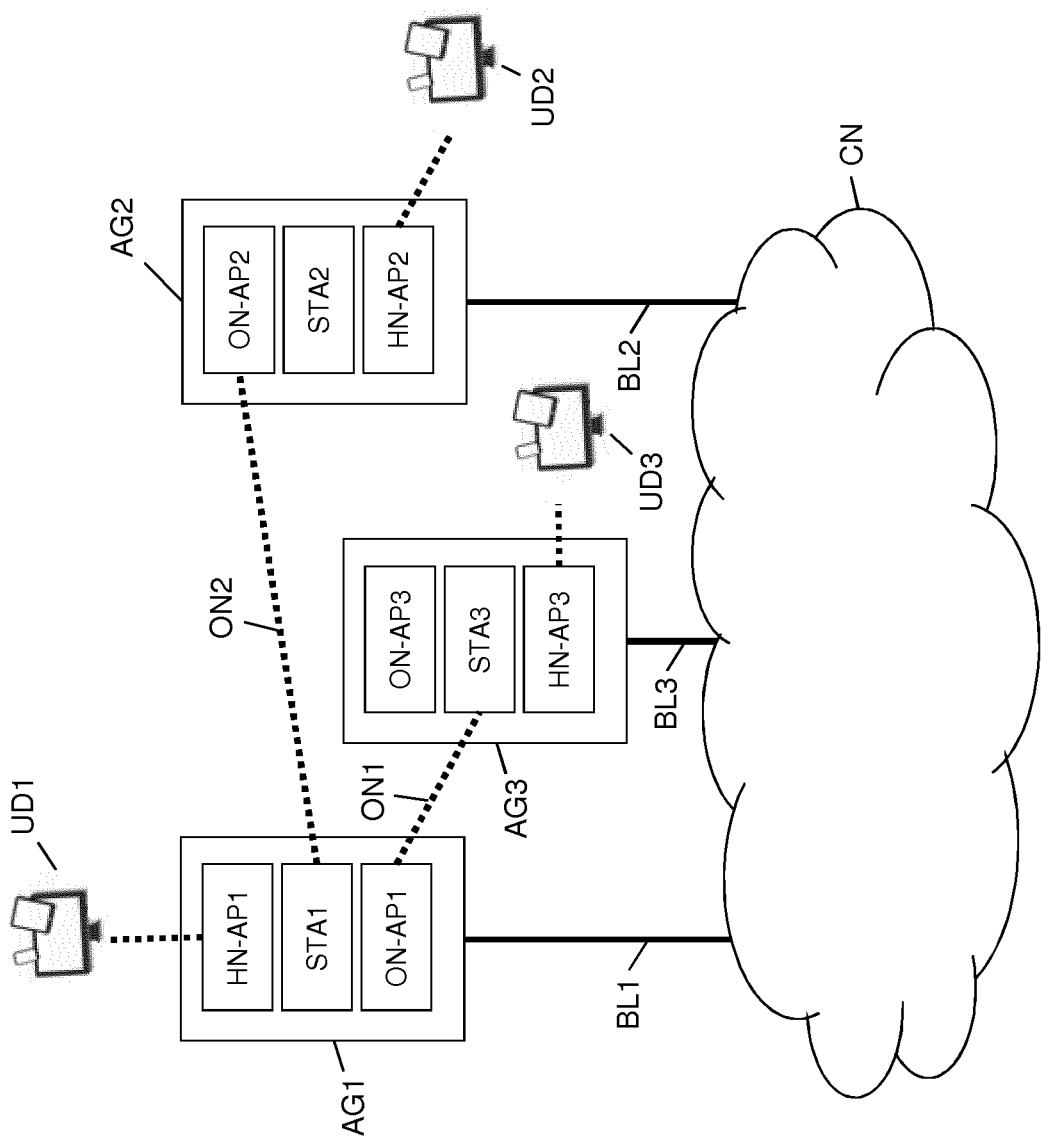
FIG. 5 schematically shows a resource sharing session, according to a first embodiment of the present invention.

According to an embodiment of the present invention, which is schematically depicted in FIG. 5, each one of the access gateways AG1, AG2, AG3 preferably comprises:

a home network AP HN-AP1, HN-AP2, HN-AP3 suitable for allowing the access gateway AG1, AG2, AG3 exchanging traffic with user devices UD1, UD2, UD3 of its owner;

an overlay network AP ON-AP1, ON-AP2, ON-AP3 suitable for allowing the access gateway AG1, AG2, AG3 setting up one or more wireless connections with one or more station devices of other access gateways; and a station device STA1, STA2, STA3 suitable for setting up a wireless connection with an overlay network AP of one of the other access gateways.

This configuration of the access gateways advantageously allows a requester setting up an overlay network comprising two wireless connections with two different offerors at the same time, e.g. by sending a further resource request while a resource sharing session originated by a previous resource request is still ongoing.

Assuming, by way of non limiting example, that the access gateway AG1 is the requester, AG1 may advantageously setup an overlay network comprising a first overlay subnetwork ON1 in the form of a first wireless connection between its overlay network AP ON-AP1 and the station device STA3 of the access gateway AG3 as a first helper, and a second overlay subnetwork ON2 in the form of a second wireless connection between its station device STA1 and the overlay network AP ON-AP2 of the access gateway AG2 as a second helper. Hence, the requester AG1 plays the role of access point in the overlay subnetwork ON1 and the role of station device in the overlay subnetwork ON2.

Figure 6:
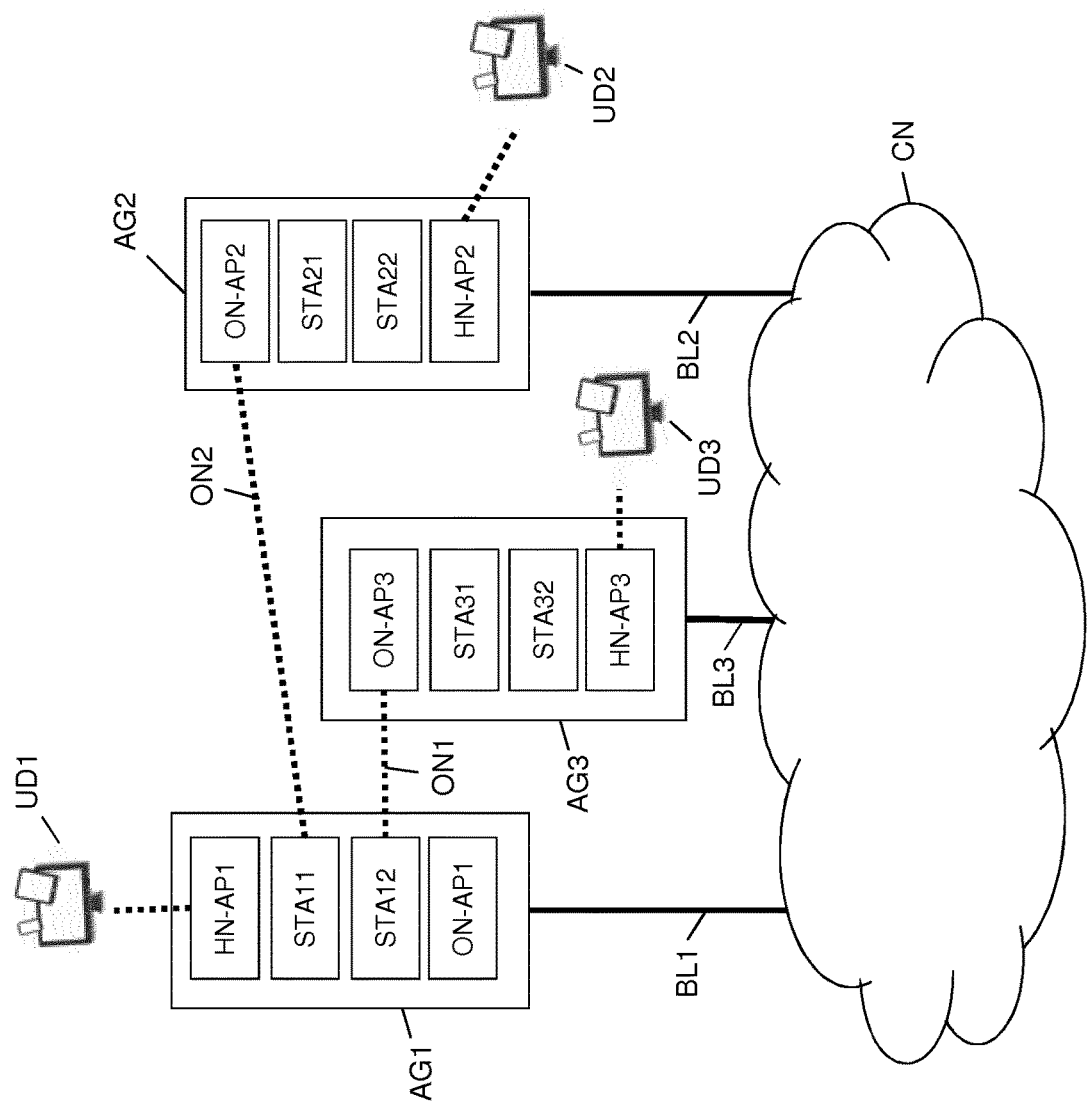
FIG. 6 schematically shows a resource sharing session, according to a second embodiment of the present invention.

According to another embodiment schematically depicted in FIG. 6, each one of the access gateways AG1, AG2, AG3 preferably comprises:

a home network AP HN-AP1, HN-AP2, HN-AP3 suitable for allowing the access gateway AG1, AG2, AG3 exchanging traffic with user devices UD1, UD2, UD3 of its owner;

an overlay network AP ON-AP1, ON-AP2, ON-AP3 suitable for allowing the access gateway AG1, AG2, AG3 setting up one or more wireless connections with one or more station devices of other access gateways; and two station devices STA11, STA12, STA21, STA22, STA31, STA32 suitable for setting up respective wireless connections with the overlay network APs of two other access gateways.

Also this configuration of the access gateways advantageously allows a requester setting up an overlay network comprising two wireless connections with two different offerors at the same time.

Assuming, by way of non limiting example, that the access gateway AG1 is the requester, AG1 may advantageously setup a first overlay subnetwork ON1 in the form of a first wireless connection between its station device STA12 and the overlay network AP ON-AP3 of the access gateway AG3 as a first helper, and a second overlay subnetwork ON2 in the form of a second wireless connection between its station device STA11 and the overlay network AP ON-AP2 of the access gateway AG2 as a second helper. Hence, the requester AG1 plays the role of station device in both the overlay subnetworks ON1, ON2. An overlay network wherein the requester plays the role of station device and the offeror plays the role of AP may be advantageous in that the implementation of load balancing mechanisms on station devices is better supported by some Linux distribution for wireless routers (e.g., OpenWrt).

In both the embodiments shown in FIGS. 5 and 6, the overlay subnetworks ON1, ON2 are built on the same frequency band (e.g. 2.4 GHz) and all the APs and station devices share the same wireless channel, as agreed during negotiation as described above. A drawback of these configurations may be that all the home traffic and the overlay network traffic use the same wireless channel, and this may reduce the throughput of each user device communicating on that wireless channel.

According to other embodiments not shown in the drawings, each access gateway may be equipped with a card simultaneously supporting different frequency bands (e.g. 2.4 GHz and 5 GHz as provided by IEEE 802.11n or IEEE 802.11 ac). In this case, for instance, the access gateway may use one frequency band (e.g. 2.4 GHz) for the home networks and another frequency band (e.g. 5 GHz) for the overlay network.

Once the overlay network setup is completed, the requester AGi preferably parallelizes the traffic exchanged with the user devices wirelessly connected thereto so as to exploit the resources made available by the helper AGj*. For example:

- the requester AGi may route all the traffic generated by a specific user device to the helper AGj* via the overlay network, the helper AGj* forwarding such traffic to the wired communication network CN via its broadband link BLj*; or
- the requester AGi may apply a load balancing mechanism to new traffic associated to either a certain user device or all the connected user devices (e.g. a round-robin or a weighted load balancing mechanism applied to all the new opened TCP connections); or
- the requester AGi may apply a multipath TCP protocol (MPTCP) to transparently split a subset of the TCP connections of its user devices between multiple paths provided by the offeror(s).

By referring again to the flow chart of FIG. 2, after the time $T_{j*}$ offered by the helper AGj* is expired, the resource sharing session is closed (step 204). According to advantageous variants, the helper AGj* may decide to close the resource sharing session before expiration of the originally offered time $T_{j*}$, for instance if—during the sharing session—the local traffic associated to its own user's devices is unexpectedly increased.

At step 204, the requester AGi preferably updates its credit $c_{ij*}$ towards the helper AGj* by subtracting from its current value the value of quality of experience actually received from the helper AGj* during the resource sharing session 203, according to equation [2] above. Similarly, the helper AGj* preferably updates its credit $c_{j*i}$ towards the requester AGi by adding to its current value the value of quality of experience actually provided to AGi during the resource sharing session 203, according to equation [2] above.

Further, at step 204 the requester AGi also preferably calculates a new partial reputation score $r_{ij*}$ for the helper AGj*. The new reputation score $r_{ij*}$ calculated by AGi for the helper AGj* preferably takes into account both the credit towards AGj* and a level of reliability of AGj*, which basically is a ratio between the resources actually provided by the helper AGj* during the resource sharing session 203 and the resources offered by the helper AGj* during the negotiation 202.

According to a particularly preferred variant, the new partial reputation score $r_{ij*}$ calculated by the requester AGi for the helper AGj* is provided by the following equation:

$$r_{ij*} = R(v_{j*i}, \hat{v}_{j*i}, c_{ij*}) = \min\left[1, \frac{\hat{v}_{j*i}}{v_{j*i}} + \sigma(-c_{ij*})\right] \quad [5]$$

where $v_{j*i}$ is the quality of experience offered by AGj* to AGi during negotiation 202 and $\hat{v}_{j*i}$ is the quality of experience actually provided by AGj* to AGi during the resource sharing session 203.

Further, at step 204 the requester AGi also preferably updates the reputation score $R_{ij}$ of each one of the potential helpers AGj ($j \neq i$) to which the resource request was originally sent at the beginning of negotiation 202. In particular, the requester AGi preferably uses the partial reputation scores $r_{ij}$ of equation [4] for updating the reputation scores $R_{ij}$ of the potential helpers AGj ($j \neq i$). According to a preferred variant, the updating of the reputation scores $R_{ij}$ of the potential helpers AGj is calculated according to the following recursive formula:

$$R_{ij} = (1-\gamma) \cdot R_{ij} + \gamma \cdot r_{ij} \quad [6]$$

where $\gamma$ is an inflation factor comprised between 0 and 1 (more preferably between 0.9 and 0.99), which provides a smoothed exponential inflation to the partial reputation score gained during a resource sharing session over time (recent exchanges of resources are considered more relevant than past exchanges of resources).

If a potential helper defected the resource request during negotiation 202, the value of its reputation score $R_{ij}$ is unchanged.

For the helper AGj*, the partial reputation score used in equation [6] for the updating preferably is the new one calculated upon completion of the resource sharing session 203 according to equation [5]. This way, the requester AGi updates the reputation scores of the potential helpers so as to take into account their behaviour in the last resource sharing session 203.

Session after session, each access gateway therefore acquires at each one of the other access gateways a reputation score which depends on the disposition to cooperate and the reliability which it exhibited before towards each one of the other access gateways in the past resource sharing sessions. This reputation score will in turn be used by the other access gateways to decide whether to cooperate with it or not in the future.

Hence, calculation and update of the reputation score as described above is an incentive to cooperate for the access gateways, in that it automatically induces the access gateways to cooperate with each other for sharing their network resources. Such cooperation is advantageously self-sustained, in that it is implemented by the access gateways themselves, without the need of any central authority enforcing cooperation.

Hence, the method of the invention advantageously requires the exchange of a few messages between the access gateways for negotiating and setting up a resource sharing session, namely the resource requests and the resources offers. According to a preferred variant, such messages are preferably exchanged out of band with respect to the wireless channels that the access gateways currently use for communicating with the respective user devices. Alternatively, the access gateways may be equipped with a secondary short range radio transceiver (e.g. a ZigBee or Bluetooth transceiver) dedicated to the exchange of messages for negotiation and resource sharing session setup purposes.

Further, advantageously, the method of the invention is robust, since it is capable of automatically adapting to the temporarily or permanent unavailability of any one of the access gateways.

The subject method is also advantageously capable of automatically scaling, namely automatically adapting to the arrival of new access gateways. A new access gateway will indeed soon realize that cooperation is the best available choice and will start automatically cooperating with the pre-existing access gateways, provided it is also configured to implement the reputation score mechanism as described above.

The subject method is also robust against fraudulent attempts to "steal" resources from the access gateways. An access gateway trying to fraudulently obtain resources from the other AGs without reciprocating will soon be excluded from the sharing mechanism, because its reputation score at the other access gateways will be soon low enough to induce the other access gateways to permanently defect its resource requests.

Herein after, an example of the method of the invention is described, with reference to a scenario comprising five neighbouring access gateways AG1, AG2, AG3, AG4 and AG5 as per FIG. 1. It is assumed by way of example that the user of AG1 wishes to upload some files from her/his tablet to the cloud. It is also assumed that the access gateway AG1 is connected to the Internet via an ADSL broadband link providing a maximum uplink throughput of 1 Mbps and a maximum downlink throughput of 10 Mbps. Further, the access gateway AG1 supports IEEE 802.11n standard on a single band (2.4 GHz). While the user is uploading the files, she/he is not satisfied with the current uploading speed and therefore decides to request resources to her/his neighbours. Through an app or a web interface running on the tablet, the user instructs the access gateway AG1 accordingly.

Figure 4:
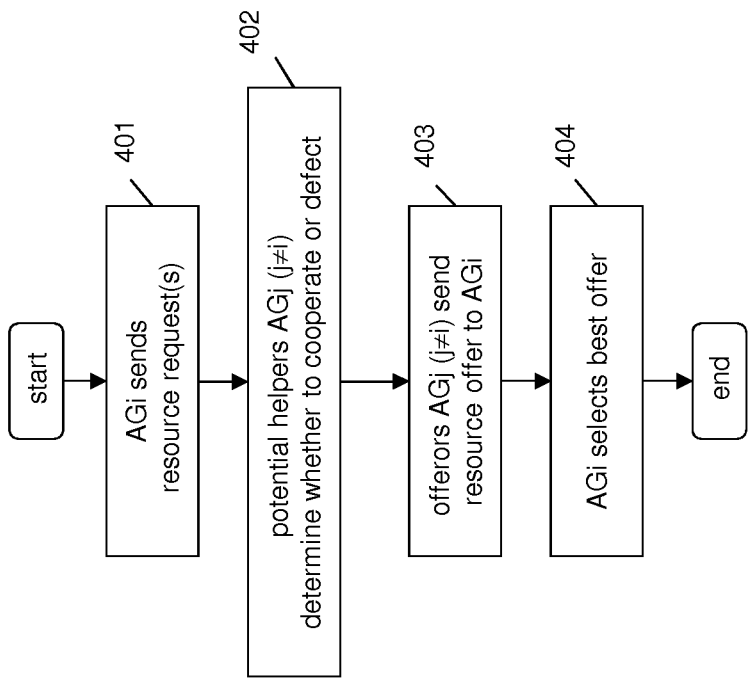
FIG. 4 is a more detailed flow chart of the negotiation step of FIG. 2.

The access gateway AG1 then evaluates uplink and downlink throughput currently used by the tablet, e.g. 1 Mbps and 100 kbps respectively, and sends a resource request to the potential helpers AG2, AG3, AG4, AG5 (step 401 in FIG. 4). As a first guess, the requester AG1 requests the same uplink and downlink throughput currently used by the tablet (namely $B_u=1$ Mbps and $B_d=100$ kbps), trying to double its upload speed, for e.g. T=10 minutes. Furthermore, AG1 also requests that its own current wireless channel (e.g. channel 1 on 2.4 GHz band) is used for the overlay network, and it also requests the potential helpers to play the role of AP in the overlay network.

Each potential helper AG2, AG3, AG4, AG5 receives the resource request from AG1 and, first of all, determines whether to cooperate or not based on the current reputation score $R_{21}$, $R_{31}$, $R_{41}$, $R_{51}$ of AG1 (step 402 in FIG. 4). The reputation scores $R_{21}$, $R_{31}$, $R_{41}$, $R_{51}$ are in principle different from each other, since each one of them is a subjective assessment which each potential helper AG2, AG3, AG4, AG5 makes of the past behaviour of the requester AG1 in response to its resource requests. For instance, the reputation scores $R_{41}$, $R_{51}$ calculated by AG4, AG5 are lower than a minimum threshold, so that AG4, AG5 decide to defect the resource request of AG1. Besides, the reputation scores $R_{21}$, $R_{31}$ calculated by AG2, AG3 are higher than the minimum threshold, so that AG2, AG3 decide to cooperate.

The potential helpers (now offerors) AG2, AG3 therefore prepare and send to AG1 their resource offers (step 403 in FIG. 4). In particular, as described above, each one of AG2, AG3 assesses the unused throughput on its broadband link, estimates the RSSI of AG1 in order to estimate a maximum throughput of a wireless connection with AG1, determines whether it shall (and is available to) switch channel and if it is available to play the role of AP in the overlay network with AG1. Then, AG2 and AG3 send their offers to AG1.

When the requester AG1 receives the resource offers from AG2 and AG3, it selects the best one (step 404 in FIG. 4). To this purpose, as described above, the requester AG1 calculates the quality of experience values $v_{21}$, $v_{31}$ offered by the offerors AG2, AG3. It is assumed for instance that $v_{21}>v_{31}$, so that the requester AG1 selects the resource offer from AG2, which accordingly becomes the helper of AG1. AG1 then sends an acknowledge message to the helper AG2, which triggers channel switch if needed.

The requester AG1 then starts the resource sharing session (step 203 in FIG. 2) by building up a first overlay subnetwork in the form of a wireless connection between its station device and the overlay network AP of the helper AG2. A DHCP (Dynamic Host Configuration Protocol) server running on the helper AG2 preferably assigns an IP address to AG1 (a specific subnet is used for all clients connected to the overlay network AP of AG2). In addition a NATting can be performed on the IP addresses of traffic generated by the user devices connected to the home network AP of AG1 towards the overlay network AP of the helper AG2.

The requester AG1 may then start applying a load balancing technique to the traffic exchanged with the tablet uploading the user's photos, e.g. a round-robin or a weighted TCP flow balancing of new TCP connections opened by the tablet.

During this resource sharing session, the requester AG1 detects whether the helper AG2 is actually providing the entire offered throughput, e.g. by evaluating whether the uploading speed of the photos is increased.

The requester AG1 may also send a new resource request to AG3 (step 402 in FIG. 4), for further increasing the uploading speed. The parameters of the resource request may be the same as the previous one sent to all the potential helpers, but this time AG1 requests AG3 to act as station device on the same wireless channel used to cooperate with AG2. AG3 accepts the request and sends its resource offer to AG1 (step 403 in FIG. 4), which accepts it (step 404 in FIG. 4). A second overlay subnetwork is accordingly established in the form of a wireless connection between the overlay network AP of AG1 and the station device of AG3. The requester AG1 may then modify its load balancing strategy in order to start using also the resources made available by AG3, thus parallelizing its traffic on three different broadband links to the communication network CN. The uploading speed is therefore advantageously further increased.

Though in the present description reference has been made to Wi-Fi as wireless technology allowing an access gateway to connect with user devices and with other access gateways for building overlay networks, according to other embodiments other wireless technologies may be used, e.g. ZigBee, Bluetooth, Wireless-Mbus and so on. As to the negotiation step 202, mechanisms different from that described may be used, e.g. negotiation may be carried out as a SIP session, if a SIP/VoIP client is available on the access gateways. Further, in order to build the overlay network, a Wi-Fi direct standard may be employed.

The invention claimed is:

1. A method for sharing network resources made accessible by a set of access gateways, the method comprising:
   a) at a first access gateway of the set of access gateways, sending a resource request to a second access gateway of the set of access gateways;
   b) at the second access gateway, deciding whether to cooperate with the first access gateway based on a reputation score calculated by the second access gateway for the first access gateway, the reputation score being indicative of a likelihood of the first access gateway to offer resources to the second access gateway in response to a resource request from second access gateway and, when the second access gateway decides to offer at least part of the requested resources to the first access gateway, sending a resource offer to the first access gateway; and
   c) at the first access gateway, deciding whether to accept the resource offer sent by the second access gateway to the first access gateway and, when the first access gateway decides to accept the resource offer from the second access gateway, setting up a resource sharing session with the second access gateway.

2. The method according to claim 1, wherein at b) the reputation score of the first access gateway is calculated by the second access gateway taking into account a resource credit of the second access gateway towards the first access gateway, the credit being calculated by the second access gateway as an algebraic sum of amounts of resources provided by the second access gateway to the first access gateway and amounts of resources received by the second access gateway from the first access gateway in at least one past resource sharing session.

3. The method according to claim 1, wherein at b) the reputation score of the first access gateway is calculated by the second access gateway taking into account a disposition shown by the first access gateway to cooperate with the second access gateway, the disposition being calculated as a ratio between an amount of resources offered by the first access gateway to the second access gateway in response to at least one past resource request sent by the second access gateway to the first access gateway and an amount of resources requested by the second access gateway in the at least one past resource request.

4. The method according to claim 1, wherein at b) the reputation score of the first access gateway is calculated by the second access gateway taking into account a reliability shown by the first access gateway toward the second access gateway, the reliability being calculated as a ratio between an amount of resources actually provided by the first access gateway to the second access gateway in response to at least one past resource request sent by the second access gateway to the first access gateway and an amount of resources offered by the first access gateway to the second access gateway in response to the at least one past resource request.

5. The method according to claim 1, wherein at b) the second access gateway decides to cooperate with the first access gateway if the reputation score is higher than a threshold value.

6. The method according to claim 1, wherein:
   a) comprises sending the resource request by the first access gateway to a plurality of identified potential helpers including the second access gateway, each potential helper being identified by the first access gateway as an access gateway of the set of access gateways whose signal strength received at the first access gateway is above a minimum threshold capable of guaranteeing a minimum throughput between the first access gateway and the potential helper;
   at b) each potential helper decides whether to cooperate with the first access gateway based on a reputation score calculated by the potential helper for the first access gateway, the reputation score being indicative of a likelihood of the first access gateway to offer resources to the potential helper in response to a resource request from the potential helper and, when a potential helper decides to cooperate with the first access gateway, the potential helper sends a respective resource offer to the first access gateway; and
   c) comprises receiving resource offers from potential helpers which at b) decided to cooperate and deciding whether the resource offer received from the second access gateway is the best offer amongst the received resource offers.

7. The method according to claim 6, wherein:
   at a) the resource request comprises at least an amount of resources requested by the first access gateway and a time interval T for which the amount of resources is requested by the first access gateway; and
   at b) the resource offer sent by each one of the potential helpers comprises at least an amount of resources offered by the potential helper and a time interval $T_j$ for which the amount of resources is offered by the potential helper.

8. The method according to claim 7, wherein c) comprises:
   calculating a value of an offered quality of experience parameter $v_{ji}$ for the resource offer received from each potential helper, the offered quality of experience parameter $v_{ji}$ being calculated based on the amount of resources offered by the potential helper and the time interval $T_j$ for which the amount of resources is offered by the potential helper; and
   deciding whether the resource offer received from the second access gateway is the best offer amongst the received resource offers by deciding whether the resource offer received from the second access gateway has the highest value of offered quality of experience $v_{ji}$.

9. The method according to claim 6 wherein, after the resource sharing session is closed, the first access gateway updates a further reputation score of each one of the potential helpers, the further reputation score being indicative of a behavior of the potential helper in response to at least one past resource request sent by the first access gateway to the potential helper.

10. The method according to claim 9, wherein:
   for the second access gateway, the updating comprises adding to a current value of the further reputation score a value that depends on a ratio between an amount of resources provided by the second access gateway to the first access gateway during the resource sharing session and an amount of resources offered in the resource offer sent by the second access gateway to the first access gateway at b); and
   for each potential helper other than the second access gateway, the updating comprises adding to a current value of the further reputation score a value that depends on a ratio between an amount of resources offered by the potential helper to the first access gateway and an amount of resources requested by the first access gateway in the resource request.

11. The method according to claim 1 wherein, after the resource sharing session is closed:
the first access gateway updates a credit value $c_{ij*}$ towards the second access gateway by subtracting therefrom an amount of resources provided by the second access gateway to the first access gateway during the resource sharing session; and
the second access gateway updates a credit value $c_{j*i}$ towards the first access gateway by adding thereto the amount of resources provided by the second access gateway to the first access gateway during the resource sharing session.

12. The method according to claim 1, wherein c) comprises building an overlay network comprising at least one connection between the first access gateway and the second access gateway, which allows an end user connected to the first access gateway accessing the resources offered by the second access gateway.

13. The method according to claim 12, wherein the first access gateway comprises an access point and the second access gateway comprises at least one station device, the overlay network comprising a connection between the access point and the at least one station device.

14. The method according to claim 12, wherein the first access gateway comprises at least one station device and the second access gateway comprises an access point, the overlay network comprising a connection between the at least one station device and the access point.

15. A non-transitory computer readable medium including computer-readable instructions that, when executed by a computer, cause the computer to perform the method according to claim 1.

16. An access gateway, comprising:
circuitry configured to:
a) receive a resource request from a further access gateway;
b) decide whether to cooperate with the further access gateway based on a reputation score calculated by the access gateway for the further access gateway, the reputation score being indicative of a likelihood of the further access gateway to offer resources to the access gateway in response to a resource request from the access gateway and, when the access gateway decides to offer at least part of the requested resources to the further access gateway, send a resource offer to the further access gateway; and
c) if the further access gateway decides to accept the resource offer sent by the access gateway, set up a resource sharing session with the further access gateway.

* * * * *